Nov. 3, 1970 R. S. BRAHMAN 3,538,259

PHASE ADJUSTING ARRANGEMENT FOR FM STEREO RECEIVER

Filed Nov. 16, 1967 2 Sheets-Sheet 1

INVENTOR.
RODMAN S. BRAHMAN,
BY
Wolfe, Hubbard, Voit & Osann
ATTORNEYS.

"NORMAL" CONDITION SWITCH 220 "IN"

"ADJUST" CONDITION
SWITCH 220 PULLED OUT

INVENTOR.
RODMAN S. BRAHMAN,
BY
Wolfe, Hubbard, Voit & Osann
ATTORNEYS.

United States Patent Office 3,538,259

Patented Nov. 3, 1970

3,538,259 PHASE ADJUSTING ARRANGEMENT FOR FM STEREO RECEIVER

Rodman S. Brahman, Berrien Springs, Mich., assignor to Heath Company, St. Joseph, Mich., a corporation of Delaware Filed Nov. 16, 1967, Ser. No. 683,725

Int. Cl. H04h *5/00*

U.S. Cl. 179—15 1 Claim

ABSTRACT OF THE DISCLOSURE

An FM stereo receiver for receiving a multiplex signal in which the *L—R* signal is modulated on a subcarrier, the receiver having a detector and demultiplexing circuit with means for adding a locally generated reference wave, adjustable in phase, to the subcarrier signal from the detector stage and with means for temporarily shifting the signal 90° so that the reference wave may be adjusted to proper phase by listening for a null condition.

In prior Pat. 3,328,529 issued on June 27, 1967 to Carl F. Heald on behalf of Health Company, the problem of adjusting the relative phase of the reference wave in an FM stereo receiver is set forth in some detail. It will suffice to say that proper stereo reproduction requires that a locally generated reference wave, at the center frequency of the subcarrier signal, be added to the subcarrier signal precisely in phase. For insuring that the wave locally generated in the receiver is of correct frequency, a pilot wave of exactly half the frequency of the subcarrier is broadcast as a component of the multiplex transmission for synchronizing purposes. However, the pilot wave, as utilized in the receiver, is not necessarily in phase with the subcarrier, so that adjustment is necessary. Such mis-phasing may occur by reason of the fact that the pilot signal and subcarrier signal pass through different circuitry thus undergoing different amounts of phase shift and by the fact that different transmitting stations transmit the pilot signal at differing phase angles.

It is an object of the invention to provide means for adjusting the relative phase of the locally-generated reference wave which enables the adjustment to be made easily and with a higher degree of precision than has been possible in the past. More specifically, means are provided enabling the user to adjust by listening for a null condition which is more clearly defined than a maximum output condition.

It is another object of the invention to provide a single control for switching to the 90° phase condition and for subsequent adjustment of the proper phasing by listening for a null as the phase adjusting control is rotated, the switching being achieved by axial movement of the adjusting knob.

Other objects and advantages of the invention will become apparent upon reading the attached detailed description and upon reference to the drawings in which.

While the invention will be described in connection with a preferred embodiment, it will be understood that I do not intend to be limited to the particular embodiment shown but, on the contrary, intend to cover the various alternative and equivalent arrangements included within the spirit and scope of the appended claims.

Figures 1, 2:
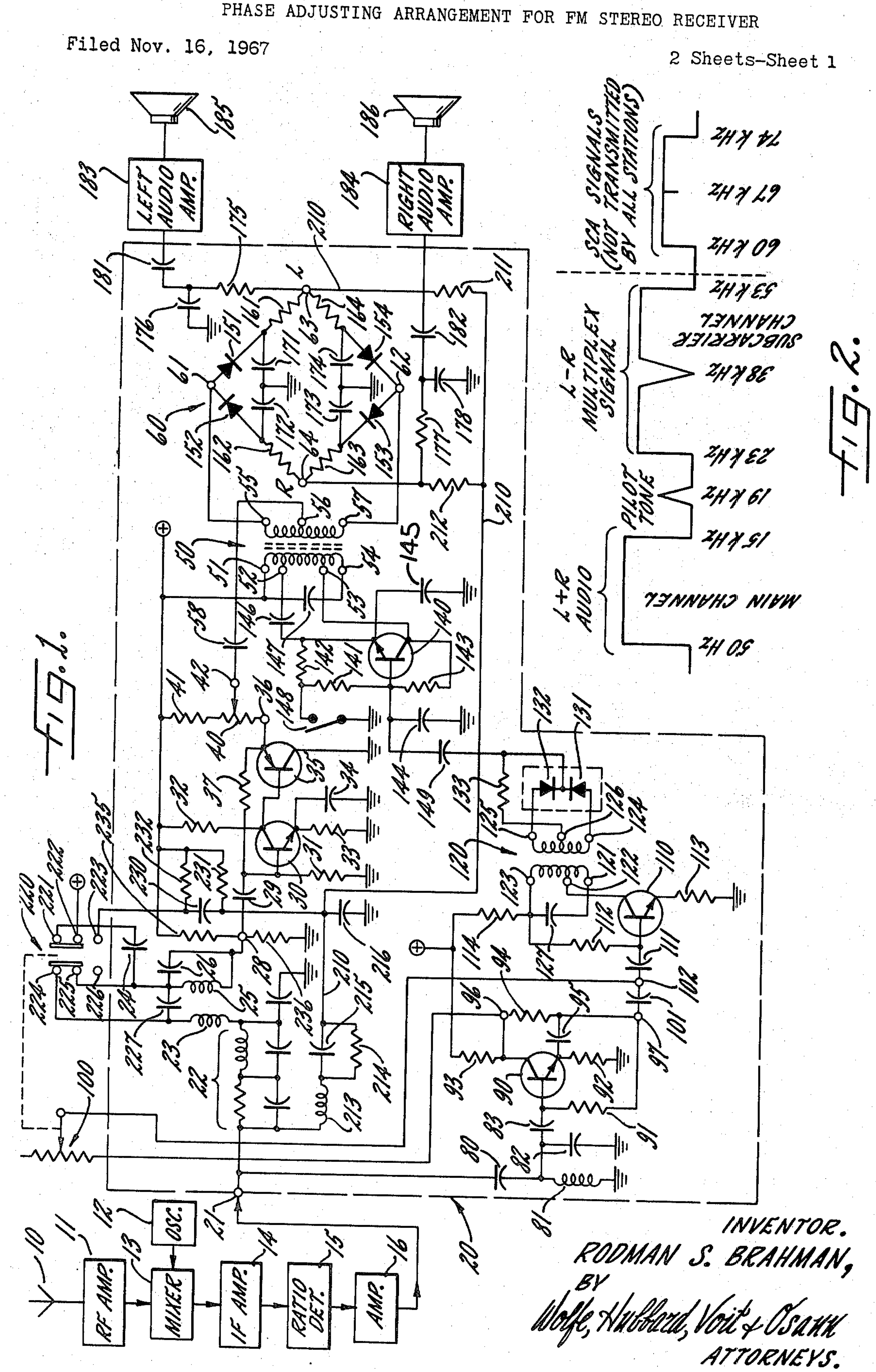
FIG. 1 is a circuit diagram, partly schematic, of an FM stereo receiver including a phase adjusting arrangement constructed in accordance with the present invention.
FIG. 2 is a diagram showing the components of the transmitted FM signal.

Turning now to the drawings, FIG. 2 shows the components normally found in an FM stereo signal. The "*L+R*" signal, which is in the audio spectrum (50 Hz. to 15 kHz.) is referred to as the "main channel" and is the portion of the signal utilized by monophonic FM receivers. Above the audio range and extending on each side of a center frequency of 38 kHz. is a multiplex signal in the form of a suppressed carrier amplitude-modulated by the difference between the right and left hand audio channels referred to as "*L—R.*" Interposed between the audio and multiplex signals is the pilot signal at a frequency of 19 kHz. which is used for a phasing reference in decoding the multiplex signal as will be discussed. At the top end of the spectrum are optionally-transmitted signals referred to as "SCA" which are not utilized in the present receiver. The present invention has to do primarily with the manner in which the pilot tone is made use of to insure maximum decoding efficiency in the demultiplexing portion of the circuit.

Turning, then, to FIG. 1 there is shown a schematic diagram of an FM stereo receiver with conventional portions of the circuit being indicated in block form. An antenna 10 is connected to an R.F. amplifier 11. The signal from the R.F. amplifier, together with the signal from a local oscillator 12, is fed to a mixer 13 which produces a heterodyne signal having a center frequency of 10.7 mHz. The latter signal is amplifier in an I.F. amplifier 14, following which the signal passes into a ratio detector 15 and is further amplified in an amplifier 16. The output of the ratio detector and its associated amplifier is in the form of a composite wave formed of the "*L+R*" signal having a 38 kHz. suppressed carrier signal superimposed thereon, amplitude-modulated with the "*L—R*" information.

The composite signal is fed to the input terminal 21 of a demultiplexing circuit generally indicated at 20. Within the demultiplexing circuit the composite signal is first passed through a series of filters. The first filter 22 is an SCA trap for the purpose of removing that portion of the signal above 60 kHz. which is unnecessary and undesirable in the receiver shown. A second filter formed by inductance 23 and capacitance 24 forms a trap for removing noise above the upper limit of the multiplex band, i.e., above 53 kHz. To insure removal of the SCA frequencies centered at 67 kHz. there is a further trap formed of inductance 25 and capacitor 26. As a result the composite signal applied to filter output terminal 28 is clean and substantially free of extraneous signals beyond the multiplex signal band. Means are provided in the filtering portion of the circuit for passing the subcarrier frequencies centered at 38 kHz. and for simultaneously bringing about a 90° phase shift for phase adjusting purposes, but discussion of this will be reserved to a later point.

For the purpose of amplifying the composite signal, terminal 28 is coupled, via a capacitor 29, to a transistor amplifier stage 30, having resistors 31, 32, 33 in the base, collector and emitter circuits respectively, the latter being bypassed by a capacitor 34. The collector is direct coupled to the base of an emitter follower transistor 35 having an output terminal 36. A resistor 37, connected from the output terminal 36 to the base of the transistor 30 provides bias and increases the stability of the transistor 30. A separation potentiometer 40, having a series resistor 41, and slider or output terminal 42, adjusts the magnitude of the output signal.

To separate the composite signal into left and right (L and R) components, the composite signal is combined with a reference wave at the frequency of the subcarrier (38 kHz.) by means of a transformer 50 for feeding to a switching type detector. The transformer has a first winding with terminals 51–54 and a second winding having terminals 55–57. The composite signal is coupled to the transformer terminal 56 via a coupling capacitor 58 while the reference wave, as will be seen, is injected through terminals 52, 53 on the first winding. The output terminals 55, 57 of the transformer feed a switching detector 60 having input terminals 61, 62 and output terminals 63, 64 which feed the left and right audio channels respectively.

Prior to discussing the operation of the transformer 50 and switching detector 60, reference will be made to the means for generating the reference 38 kHz. wave. In generating the reference wave, the 19 kHz. pilot signal is first separated from the composite signal from the ratio detector, then amplified and doubled in frequency for the purpose of synchronizing a local 38 kHz. oscillator, the output of which is coupled to the first transformer winding. Thus, connected to the input terminal 21 of the demultiplexing circuit is a coupling capacitor 80 which feeds a 19 kHz. resonant circuit formed of inductor 81 and a capacitor 82 which is in parallel with it. Such resonant circuit insures that only the 19 kHz. signal will be passed to the successive portions of the circuit via a coupling capacitor indicated at 83. The pilot signal is first fed to the base of a phase inverting transistor 90 having a base resistor 91, an emitter resistor 92 and a collector resistor 93. In series with the resistor 91 is a resistor 94 with a capacitor 95 at the junction. Because of the phase inversion which occurs in the transistor the signals appearing at the terminals 96, 97 are 180° out of phase with respect to one another. For adjusting the resultant phase a phase control rheostat 100 is connected across the terminals in series with a capacitor 101 to provide an output terminal 102.

For the purpose of amplifying and doubling the frequency of the 19 kHz. signal a transistor amplifier is provided having an output transformer, the output of which is full-wave rectified, doubling the number of wave impulses. The transistor indicated at 110, is fed through a coupling capacitor 111 and has a base resistor 112 and an emitter resistor 113. The collector is fed through resistor 114. Coupled to the collector is a transformer 120 having primary terminals 121–123 and secondary terminals 124–126. The transformer is resonated at the pilot frequency by a capacitor 127 connected across the primary winding. The secondary terminals 124, 125 are connected to a full-wave rectifier in the form of a pair of diodes 131, 132, the circuit being completed to the center tap of the winding via a resistor 133.

For providing the 38 kHz. wave energy, a 38 kHz. wave oscillator is provided in the form of a transistor 140 having base resistors 141, 143 and emitter resistor 142, the base being coupled to ground by capacitor 144. The collector is connected to the terminal 53 of the transformer while the emitter is coupled to terminal 52 of the transformer via a capacitor 146. To resonate the circuit at approximately 38 kHz, a capacitor 147 is connected across the transformer terminals 51, 54. A grounding switch 148 connected to the junction between resistors 141, 142 turns the oscillator on. In operation, the voltage pulses from the diodes 131, 132, occurring at double the frequency of the pilot wave, and applied to the base of the transistor 140 via a coupling capacitor 149, lock the oscillations of the transistor 140 into precise phase synchronism. In short, the composite wave, consisting of the main audio signal and the modulated subcarrier which is superimposed upon it, are effectively added, by transformer 50, to the reference oscillations from the 38 kHz. oscillator 140. It is the sum of these waves which is fed to the switching detector to derive envelopes corresponding to the left and right-hand audio channels.

Turning attention to the specific circuit of the switching detector, it will be noted that it is in the form of a bridge circuit having diodes 151–154 and resistors 161–164 in the respective legs. Filter capacitors 171–174 connected between the respective diode-resistor junctions and ground act to hold the peak voltage achieved from one cycle to the next and thus, as will be seen, contribute toward smooth and well defined wave envelopes. RC output filters formed of resistor 175 and capacitor 176 in the left-hand output circuit and resistor 177 and capacitor 178 in the right-hand output circuit serve to de-emphasize the high frequency components which were artifically "pre-emphasized" at the transmitter. Coupling capacitors 181, 182 feed the respective signals to amplifiers 183, 184 which energize left and right hand loudspeakers 185, 186.

Figure 3:
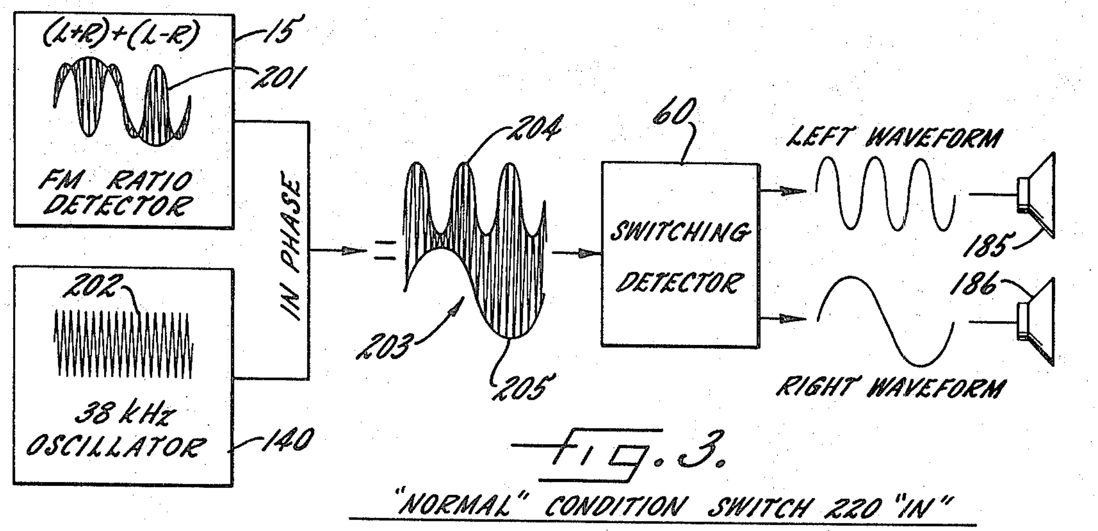
FIG. 3 is a diagram showing the addition of the composite wave and the reference wave in phase and the derivation of the resulting envelopes.

While the operation of a switching detector is known to one skilled in the art, it will be helpful to describe the operation briefly in connection with the diagram of FIG. 3. In the latter figure the composite wave from the ratio detector is indicated at 201. The 38 kHz. reference wave, indicate at 202, is added in phase with the wave 201 to produce a wave 203 with the peaks thereof defining an upper wave form 204 and a lower wave form 205. During the positive peaks, with terminal 61 positive with respect to the terminal 62, diodes 151, 154 conduct so that output voltage is supplied to terminal 63 feeding the left-hand channel. Conversely, when terminal 61 is negative no conduction takes place through the diodes 151, 154, but diodes 152, 153 conduct to produce output voltage at terminal 64 which feeds the right-hand audio channel. The capacitors 171, 174 store the voltage between positive peaks so that the "upper" envelope 204 is passed to the left-hand speaker 185. Similarly, the capacitors 172, 173 store the negative peaks so that the "lower" envelope 205 is passed to the right-hand speaker 186. This reconstitutes the original right and left hand channels.

Since the above detection process is not mutually exclusive, some left-hand channel signal may be present in the right output channel and vice versa. To compensate for this a portion of the composite stereo signal is taken from the input terminal 21 and fed to the left and right hand channels 180° out of phase, i.e. subtractively. Thus the composite signal flowing through input line 210 is applied to the left and right hand channels through resistors 211, 212 in parallel with the detector output terminals 63, 64 respectively. The relative phase reversal is brought about in the transistor 30 which acts upon the main signal. In addition, interposed in the line 210, is a frequency selective network formed of an inductor 213, a resistor 214 and capacitors 215, 216 to alter the phase and amplitude of the compensating signal at high frequencies, thereby improving high frequency separation. The relative amount of the compensating signal is determined by the setting of the "separation" control 40.

Figure 5:
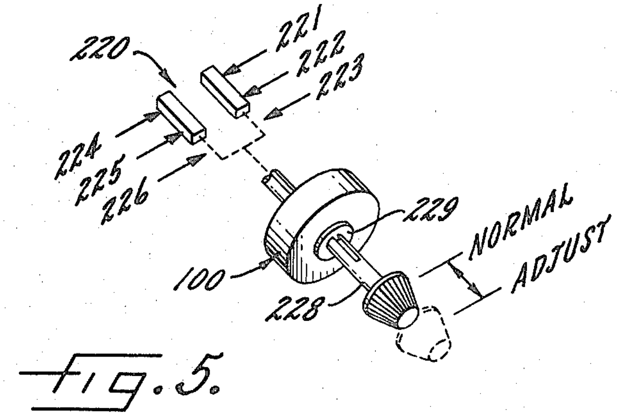
FIG. 5 is a diagrammatic view of a combined switch and "null" control for phase adjustment.

In accordance with the present invention means are provided for temporarily shifting the sugcarrier signal from the ratio detector stage by 90° with respect to the reference wave, making it possible to adjust for a null output condition in adjusting the relative phase of the reference wave, following which the 90° shift is removed with assurance that the subcarrier signal and reference wave are precisely synchronized, peak to peak. More specifically, in accordance with the invention a band pass filter, centered on the subcarrier frequency of 38 kHz., and designed to bring about a phase shift of 90°, is interposed between the ratio detector and the demultiplexing circuitry to establish the out of phase condition employed for adjustment. Even more specifically, a 90° phase-shifting band pass filter is formed by switching of components normally associated with the low pass filter formed of inductance 23 and capacitor 24. Thus as shown in FIGS. 1 and 5, a switch 220 is provided having contacts at 221–226 inclusive and movable between "normal" and "adjust" positions. Arranged in parallel with normally closed contacts 224, 225 is a series capacitor 227. The capacitor 24 normally in the circuit is connected to contact 221 so as to be open circuited under "adjust" conditions. Thus, during phase adjustment, the carrier signal centered at 38 kHz. is selectively passed and subjected to the 90° phase shift by the filter consisting of inductor 23 and capacitor 227. These components may be in a practical case be assigned values of 23 mh. and 680 pf. respectively. For assistance in practicing the invention, the other, or related components have values keyed to the reference numerals, as follows, taken from Heath Company manual covering Model AR-15 receiver:

22—3900 ohms, 7 mh.; 200 pf., 750 pf., 0.001 μf.

| | |
|---|---|
| **24**—1000 pf. | **140**—2N3393. |
| **25**—7 mh. | **141**—6800 ohms. |
| **26**—750 pf. | **142**—2200 ohms. |
| **29**—10 μf. | **143**—100K ohms. |
| **30**—2N3393 | **144**—0.01 μf. |
| **31**—220K ohms. | **146**—0.1 μf. |
| **32**—10K ohms. | **147**—2700 pf. |
| **33**—4700 ohms. | **149**—0.001 μf. |
| **34**—100 pf. | **161**—10K ohms. |
| **35**—MPS6517. | **162**—10K ohms. |
| **37**—390K ohms. | **163**—10K ohms. |
| **40**—750 ohms. | **164**—10K ohms. |
| **41**—470 ohms. | **171**—470 pf. |
| **58**—50 μf. | **172**—470 pf. |
| **80**—1800 pf. | **173**—470 pf. |
| **81**—7 mh. | **174**—470 pf. |
| **82**—8200 μf. | **175**—33K ohms. |
| **83**—100 pf. | **176**—1800 pf. |
| **90**—2N3393. | **177**—33K ohms. |
| **91**—150K ohms. | **178**—1800 pf. |
| **92**—2200 ohms. | **181**—0.047 μf. |
| **93**—2200 ohms. | **182**—0.047 μf. |
| **94**—150K ohms. | **211**—27K ohms. |
| **95**—0.01 μf. | **212**—27K ohms. |
| **100**—10K ohms. | **213**—70 mh. |
| **101**—1800 pf. | **214**—6800 ohms. |
| **110**—2N3393. | **215**—1800 pf. |
| **111**—470 pf. | **216**—680 pf. |
| **112**—220K ohms. | **230**—10 μf. |
| **113**—330 ohms. | **231**—22K ohms. |
| **114**—1500 ohms. | **232**—100K ohms. |
| **127**—0.01 μf. | **235**—9100 ohms. |
| **133**—8200 ohms. | **236**—12K ohms. |

Preferably the movable contacts of the switch 220 are coupled to the phase adjusting rheostat 100 as shown in FIG. 5 for switching from a "normal" to the "adjust" position as the shaft of the rheostat is moved endwise between limit positions. To accommodate this motion, the shaft, indicated at 228 may be slidable within, and keyed to, a bushing 229 which operates the wiper contact in the rheostat.

Audible clicking is prevented in the switching circuit by making the D-C level at the output of the filtering stage the same as at the input. This is accomplished by connecting the output terminal 28 to the junction of voltage divider resistors 235, 236.

Means are further provided for silencing the compensating signal flowing through line 210 when the control is in its "adjust" position. This is accomplished by bypassing the line 210 to the positive supply bus by means of a capacitor when the adjusting knob is pulled out. As shown in FIG. 1, the capacitor indicated at 230, and having associated resistors 231, 232, is connected to terminal 223 of the switch while terminal 221 is connected to the positive bus. The compensating signal is bypassed to the positive bus for the sake of convenience only; absent this consideration it could be just as well bypassed to ground. In any event, it will be apparent that when the switch is in its "adjust" position the compensating signal taken from line 210 is drained off through the capacitor and is thus not permitted to flow through the resistors 211, 212 associated with the switching detector. This greatly improves the sharpness of the null.

Figure 4:
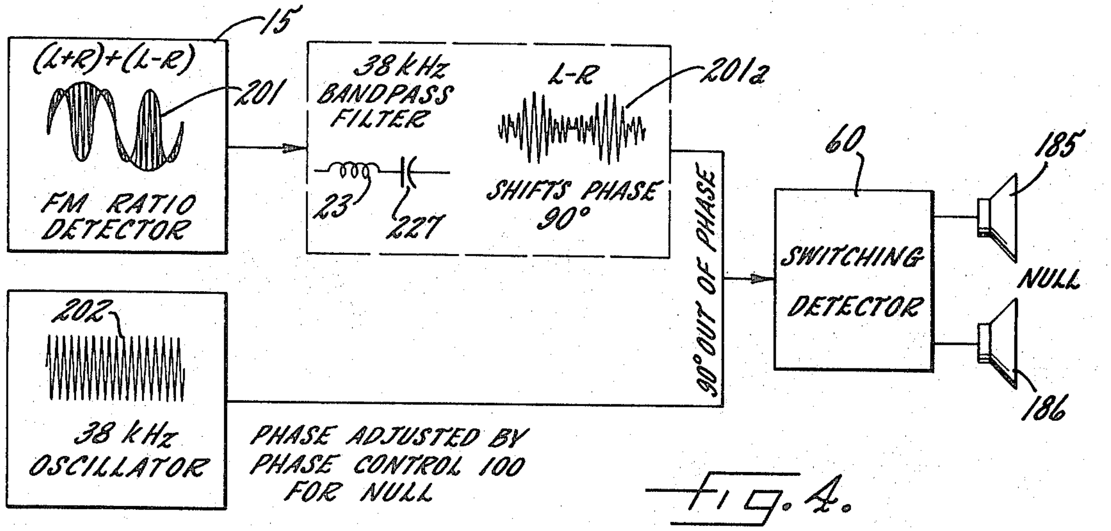
FIG. 4 is a diagram showing achieving of the null condition upon addition of the composite and reference waves offset in phase by 90°.

The manner in which the 90° phase shift achieves a null output condition is shown in FIG. 4. In this figure the reference wave is indicated at 202 while the carrier signal, free of any components below the 38 kHz. pass band, and retarded in phase by 90°, is indicated at **201*a***. Adding the instantaneous values of the two signals together produces a resultant signal (not shown) achieving a null for both the envelopes, regardless of whether the 90° shift is in the "lead" or "lag" direction.

As noted, it is one of the features of the present invention that the same filter (23, 227) which isolates the subcarrier signal is utilized to impart the desired 90° phase displacement. However it will be apparent to one skilled in the art that it is the relativity of the shift between the subcarrier signal and the 38 kHz. reference oscillations which is the important thing and that the temporary 90° shift may be brought about in the reference oscillations, if desired, without departing from the present invention. Similarly, while the preferred embodiment provides for phase adjustment of the reference oscillations, it will be appreciated that such phase adjustment may be provided in the channel of the subcarrier signal without departing from the invention. Consequently the term "relatively shifted" has been employed in the claims. The terms "left-hand channel" and "right-hand channel" have been used for convenience to denote the sound signals picked up at separated positions related to the source or their electrical equivalent.

I claim as my invention:

1. In a frequency modulation stereo multiplex receiver wherein both the left and right hand sound channels are reproduced in response to a received composite stereo multiplex signal formed of a $L+R$ signal, a subcarrier modulation $L-R$ signal, and a pilot signal conveying phasing information, the combination comprising:

circuit means for detecting the composite stereo multiplex signal;

oscillator means responsive to the pilot signal for providing reference oscillations having a frequency equal to the frequency of the subcarrier wave;

demultiplexing circuit means including a circuit coupling to said detecting circuit means to receive the detected signal output therefrom and responsive to said reference oscillations for demodulating the detected composite stereo multiplex signal to provide separate output signals corresponding respectively to said left and right hand sound channels;

a filter circuit having a frequency pass band substantially corresponding to the subcarrier modulation $L-R$ signal and providing a 90° phase shift of said signal;

adjustable phase shifting circuit means for relatively shifting the phase of said reference oscillations;

switching means selectively operative to cause said band pass filter circuit to be included in said demodulating means circuit coupling so as to impart a phase shift of 90° and band pass for demodulation, substantially only the subcarrier modulation $L-R$ signal portion of said composite stereo multiplex signal when it is desired to adjust said phase shifting circuit means for optimum reproduction of the left and right hand channels, the proper adjustment being obtained when the relatively shifted phase of said reference oscillations is such that a minimum signal output or null is produced in said left and right hand channels, said adjustable phase shifting means having a rotatable control member and wherein said switching means is selectively coupled to said control member for switching in response to axial movement of the control member between limit positions; and a spurious signal trap in circuit path between the output of said detecting means and said demultiplexing circuit and wherein said switching means is effective to switch components of the trap into the circuit forming the band pass filter.

References Cited

UNITED STATES PATENTS

| | | | |
|---|---|---|---|
| 3,328,529 | 6/1967 | Heald | 179—15 |
| 3,270,138 | 8/1966 | Golonski | 179—15 |
| 3,219,760 | 11/1965 | Loughlin | 179—15 |

KATHLEEN H. CLAFFY, Primary Examiner

T. J. D'AMICO, Assistant Examiner